United States Patent [19]

Brown et al.

[11] 4,347,724
[45] Sep. 7, 1982

[54] METHOD AND KNIVES FOR SHEARING METAL BAR

[75] Inventors: Birchel S. Brown, Valparaiso; Ted L. Myers, Chesterton; Holton C. Easter, Munster, all of Ind.

[73] Assignee: Inland Steel Company, Chicago, Ill.

[21] Appl. No.: 115,446

[22] Filed: Jan. 25, 1980

[51] Int. Cl.³ .............................................. B23D 35/00
[52] U.S. Cl. ...................................... 72/203; 72/365; 83/51; 83/623; 83/694
[58] Field of Search ................ 83/694, 636, 581, 623, 83/341, 342, 345, 917, 693, 683, 51; 30/229; 144/217; 72/203, 204, 365, 366

[56] References Cited

U.S. PATENT DOCUMENTS

| | | | |
|---|---|---|---|
| 53,416 | 3/1866 | Cole | 83/636 X |
| 496,167 | 4/1893 | McGary | 83/694 |
| 533,527 | 2/1895 | Carmody | 30/299 |
| 957,747 | 5/1910 | Clifton | 83/694 X |
| 2,246,957 | 6/1941 | Shields | 83/341 |
| 2,926,557 | 3/1960 | Ford | 83/623 |
| 3,322,012 | 5/1967 | Murray | 83/341 |
| 3,492,853 | 2/1970 | Gross | 83/51 X |
| 3,585,830 | 6/1971 | Mitchell | 83/51 X |

Primary Examiner—James M. Meister
Attorney, Agent, or Firm—Merriam, Marshall & Bicknell

[57] ABSTRACT

A metal bar undergoing hot rolling is sheared by a pair of shear knives which form a rounded wedge shape at a downstream end of the bar to minimize split ends and cobbles during the rolling operation. The two knives have respective, mating male and female sections which have peripheral cutting edges defining the rounded wedge shape. The shape and angular parameters of the peripheral cutting edges on the two knives provide a progressive, scissors-like, shearing action along the cutting edges from their upstream ends to their downstream tips.

14 Claims, 14 Drawing Figures

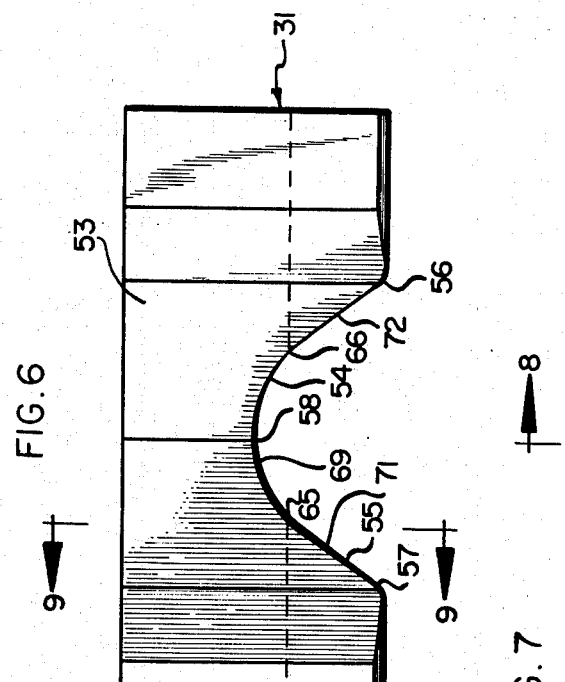
FIG. 6
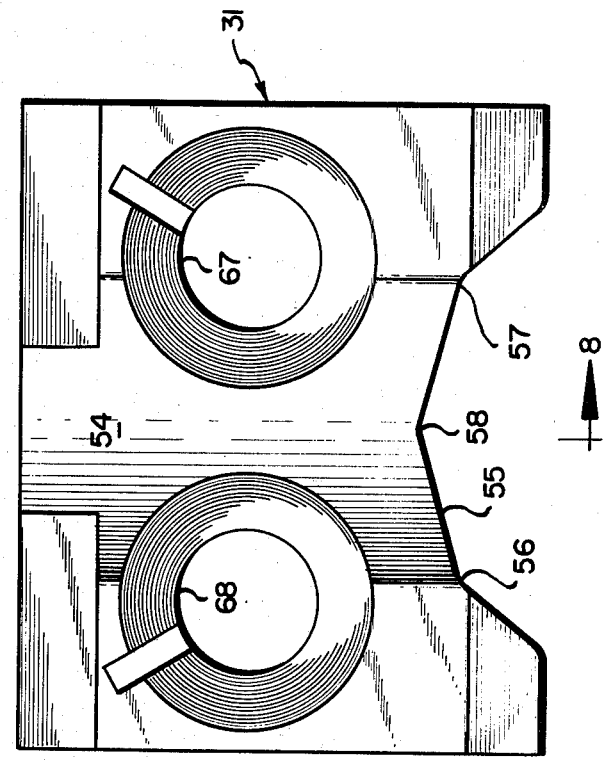
FIG. 7
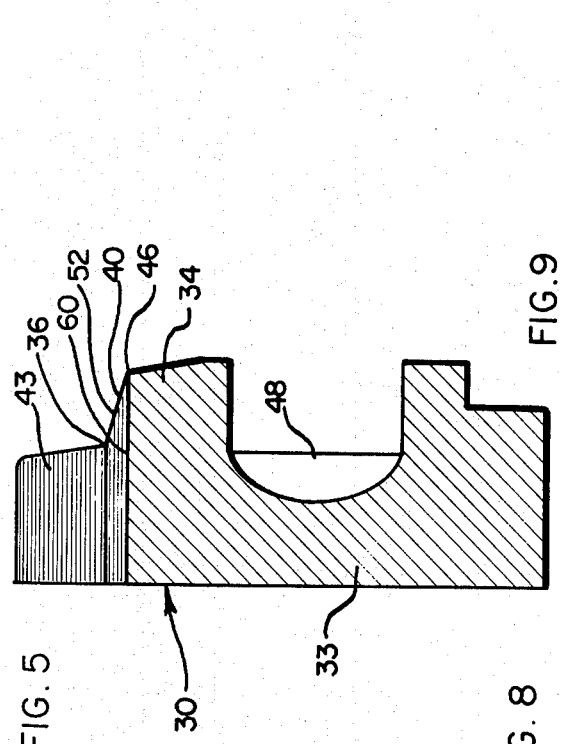
FIG. 5
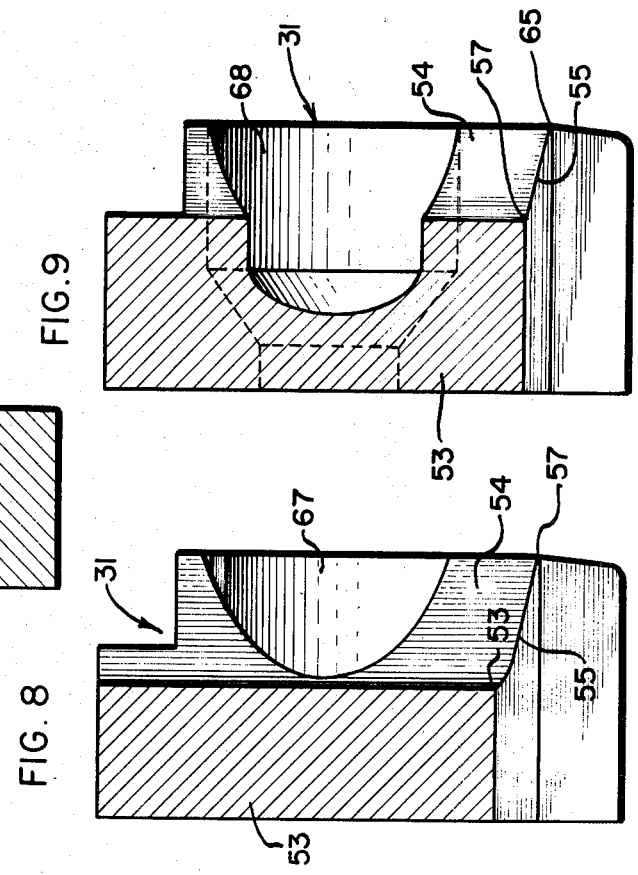
FIG. 9
FIG. 8

METHOD AND KNIVES FOR SHEARING METAL BAR

BACKGROUND OF THE INVENTION

The present invention relates generally to methods and knives for shearing a metal bar, and more particularly to methods and knives for shearing a tapered end on a metal bar as it undergoes hot rolling.

In the hot rolling of a metal bar such as steel, the bar, in a semi-finished shape such as a billet, is heated in a furnace and then typically moved continuously through a succession of spaced-apart rolling mill stands in each of which the bar undergoes a reduction in cross-sectional area and an accompanying increase in length. During the hot rolling operation, certain problems may occur. For example, in a typical rolling mill stand, there are a pair of vertically spaced rolls, separated by a gap, and a device is provided for guiding the front or downstream end of the bar into the gap between the two rolls. Occasionally, the downstream end of the bar may jam in the guide device, or it may strike a part of a roll called the "roll collar." In either case, those portions of the bar upstream of the downstream end back up and become entangled resulting in what is known as a "cobble." When this occurs, the entire mill must be shut down until the cobble can be removed, and the cobbled metal bar must be scrapped.

Another problem which may occur is the tendency of the downstream end of the bar to open up when leaving a rolling stand, resulting in what is known as a "split end". The split end may be too wide to fit through the gap between the rolls at the next mill stand, and this causes cobbling to occur when the split end encounters those rolls.

After a bar has undergone part of a continuous hot rolling operation, the front two to four feet of the bar are usually sheared off utilizing a conventional shearing device which typically cuts through the bar along a plane. The front or downstream end portion of the bar is cut off because it cools faster than the upstream parts of the bar, and this cold end portion can cause problems if not removed. For example, because the downstream end portion of the bar cools faster than trailing portions of the bar, the downstream end portion becomes harder than the upstream portions of the bar, and, when the hard downstream portion engages a roll, it may cause marking to occur on the roll. This, in turn, causes the marked roll to roll defects into the trailing part of the bar and on subsequently rolled bars.

Shearing off the downstream end portion of the bar also tended to reduce split ends, but a substantial amount of split end formation still occurred when the downstream end portion of the bar was sheared in accordance with conventional practices.

SUMMARY OF THE INVENTION

In accordance with the present invention, there is provided a method and knives for shearing the metal bar as it undergoes hot rolling, in a manner which eliminates the problems of split ends and cobbles which occurred in conventional prior art hot rolling and shearing practices.

A shearing method and knives in accordance with the present invention utilize a pair of mating shearing knives which come together to form a tapered end on the metal bar during the shearing step. A tapered end has a greater cross-sectional area of metal which must be cut than does a flat or planar end on a metal bar. Nevertheless, with shear knives in accordance with the present invention no more shearing force is required and no more impact is developed than with the use of a conventional knife which shears a flat or planar end on the metal bar. The shear knives of the present invention provide a shearing action which proceeds progressively from the back or upstream part of the tapered end to the downstream tip of the tapered end as the pair of mating shear knives come together.

A first of the two mating shear knives comprises a body section and a male section with a tapered shape protruding from the body section of the knife in a downstream direction of the bar. In a preferred embodiment, the first shear knife is a lower knife, and the male section thereon has an upwardly facing peripheral cutting edge extending from a pair of upstream ends to a downstream tip and defining the tapered shape. The peripheral cutting edge on the male cutting section has a continuous vertical drop from the upstream ends to the downstream tip. Located on the male section is a top surface with a center line extending in the downstream direction, and the top surface is inclined upwardly and outwardly from the center line to the peripheral cutting edge on the male section to provide a V-shaped cross-section in a plane transverse to the center line.

Cooperating with the above-described first knife is a second or upper knife comprising a body section and a female section having a tapered shape recessed into the body section of the knife longitudinally in the downstream direction of the bar. This recessed female section comprises means for receiving in shearing relation the protruding male section of the first shearing knife. The female section has a downwardly facing peripheral cutting edge extending from a pair of upstream ends to a downstream tip and defining the tapered shape. The peripheral cutting edge on the female section has a continuous vertical rise from its upstream ends to its downstream tip.

When the two knives are brought together, in mating relation, during the shearing operation, the shearing action proceeds progressively from the upstream ends to the downstream tips of the peripheral cutting edges on both of these knives.

Other features and advantages are inherent in the structure and methods claimed and disclosed or will become apparent to those skilled in the art from the following detailed description in conjunction with the accompanying diagrammatic drawings.

BRIEF DESCRIPTION OF THE DRAWINGS

FIG. 5 is a sectional view taken along line 5—5 in FIG. 2;

FIG. 6 is a bottom view of the second of the two mating shearing knives;

FIG. 7 is an end view, looking in a downstream direction, of the second knife;

FIG. 8 is a sectional view taken along line 8—8 in FIG. 7;

FIG. 9 is a sectional view taken along line 9—9 in FIG. 6;

DETAILED DESCRIPTION

Figure 14:
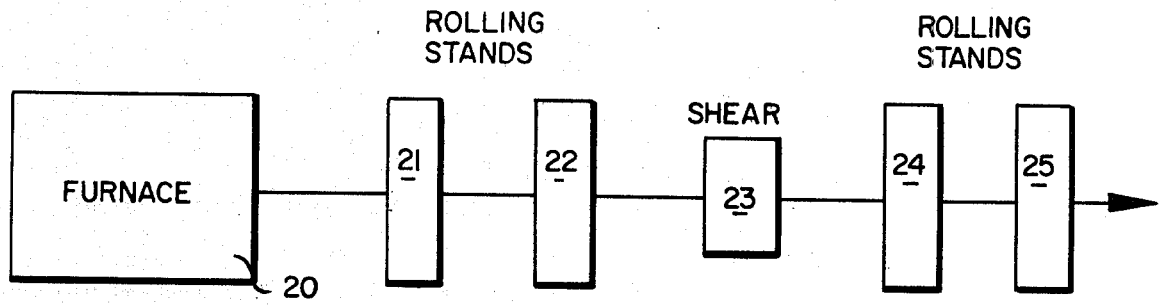
FIG. 14 is a schematic diagram illustrating a continuous hot rolling mill utilizing a shearing method in accordance with the present invention.

Referring initially to FIG. 14, there is illustrated schematically a continuous rolling mill for hot rolling a metal bar, such as a steel bar. The mill comprises a furnace 20 in which a semi-finished shape, such as a steel billet, is heated to a hot rolling temperature and then conducted downstream from the furnace in the direction of arrow 29 in FIG. 14. The mill further comprises a pair of upstream rolling mill stands 21, 22, a pair of downstream rolling stands 24, 25 and a shear 23 located between the upstream and downstream rolling mill stands.

Each shear 23 comprises a first shear knife 30, illustrated in FIGS. 1-5, and a second shear knife 31 illustrated in FIGS. 1 and 6-9.

In the drawings, first shear knife 30 is shown as a lower shear knife, and second shear knife 31 is shown as an upper shear knife. However, this vertical relationship may be reversed, or the two shear knives 30, 31 may be arranged to move in a horizontal direction towards each other rather than a vertical direction. In all of these dispositions, the structure of the knives would be the same. For convenience of description, a disposition in which first shear knife 30 is a lower knife and second shear knife 31 is an upper knife is the embodiment depicted here, but the invention is equally applicable to the other dispositions.

Figure 1:
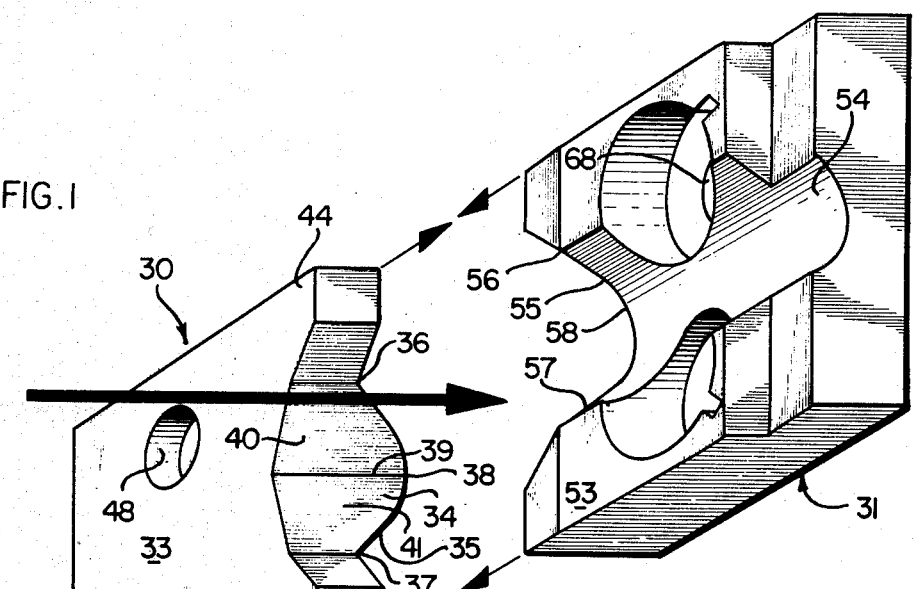
FIG. 1 is a perspective illustrating a pair of mating shearing knives constructed in accordance with an embodiment of the present invention.

Referring to FIGS. 1-5, first knife 30 comprises a block-like body section 33 from which extends a male section 34 having a tapered shape protruding from the knife in a downstream direction of the bar illustrated by arrow 29 in FIG. 1. Male section 34 has an upwardly facing peripheral cutting edge 35 extending from a pair of upstream ends 36, 37 to a downstream tip 38. Peripheral cutting edge 35 defines the tapered shape of the male section.

Male section 34 has a top surface with a center line 39 extending in the downstream direction. Inclined upwardly and outwardly from center line 39 are a pair of top surface inclined portions 40, 41 each sloping upwardly and outwardly in respective opposite directions from center line 39 to peripheral cutting edge 35, to provide a V-shaped cross-section in a plane transverse to the center line (e.g. see FIG. 3). Top surface portions 40, 41 and top surface center line 39 extend continuously from male section 34 back onto body section 33, and they are flanked on respective opposite sides of body section 33 by a pair of vertically extending projections 43, 44 each forming a part of body section 33.

Figure 3:
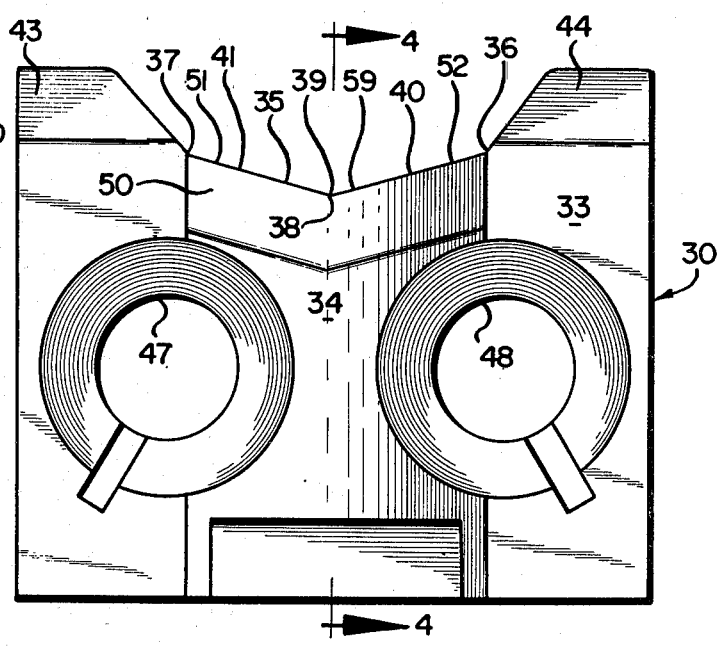
FIG. 3 is an end view, looking in an upstream direction, of the first shear knife.

Referring to FIG. 3, there is an angle between (a) each inclined top surface portion 40, 41 and (b) a horizontal plane 50 (dash-dot lines in FIG. 3) extending through center line 39, and this angle is in the range of about 6° to about 25° (13° to 17° preferred) for reasons to be subsequently described.

Figure 2:
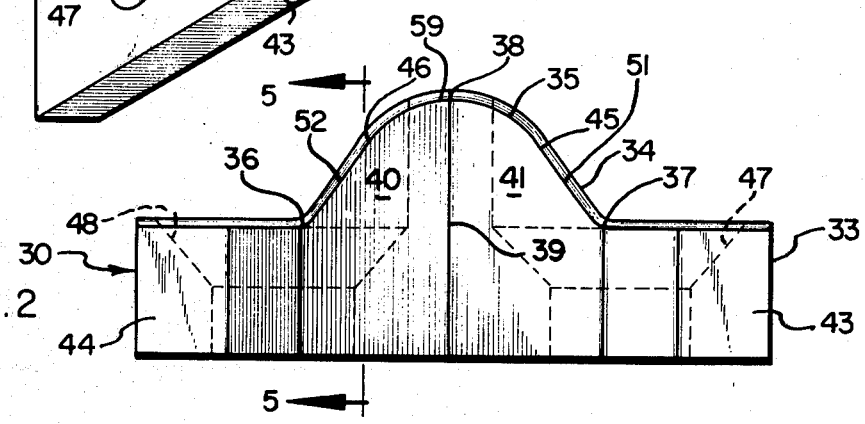
FIG. 2 is a plan view of a first of said shearing knives.

Referring to FIG. 2, peripheral cutting edge 35 has a curved part 59 extending between a pair of intermediate points 45, 46 each located between downstream tip 38 and a respective upstream end 36, 37 of edge 35. Between intermediate points 45, 46 and their corresponding upstream ends 37, 36 are straight parts 51, 52 of peripheral cutting edge 35. Straight parts 51, 52 are tangential to curved part 59 at intermediate points 45, 46. As a result of the configurations described in the preceding parts of this paragraph, the tapered shape defined by peripheral cutting edge 35 is a rounded, wedge shape.

The angular parameters of peripheral cutting edge 35 in relation to other geometric features of male section 34 are described below.

Referring to FIG. 3, there is a first angle, between (a) the horizontal plane 50 passing through center line 39 and (b) the projection, on a vertical plane perpendicular to center line 39, of curved part 59 of peripheral cutting edge 35, immediately adjacent tip 38, and this first angle is in the range of about 6° to about 25°. This is the same as the angle between inclined top surface portions 40, 41 and plane 50, described above.

Referring to FIG. 5, there is a second angle between (a) a horizontal plane 60, parallel to center line 39 and (b) a straight part 52 (or 51) of the peripheral cutting edge, and this second angle is less than the first angle.

Figure 4:
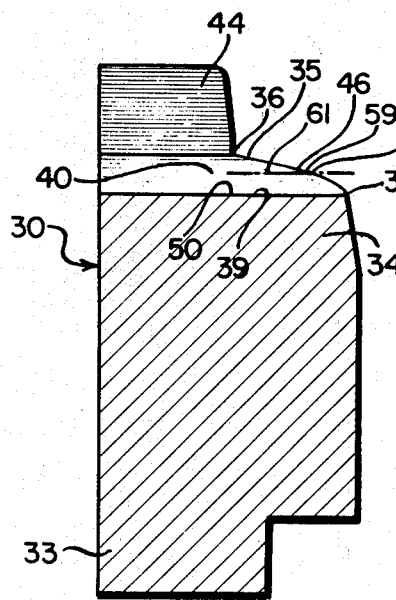
FIG. 4 is a sectional view taken along line 4—4 in FIG. 3.

In addition, referring to FIG. 4, there is a third angular relationship between (a) a horizontal plane (e.g. 61) parallel to center line 39 and (b) the projection of curved part 59 of the peripheral cutting edge on a vertical plane parallel to said center line. More particularly, the slope of curved part 59 constantly changes between intermediate points 45 or 46 and tip 38. Where a horizontal plane such as 61 intersects curved part 59, there is an angle between that plane and the tangent to said projection of curve 59, at the point of intersection (e.g. point 80 in FIG. 4). This third angle will vary, along curved part 39, from a minimum equal to the first angle, at tangent points 45 or 46, to maximum of 90° at tip 38.

The significance of the above-noted angular relationships will be described subsequently.

Shear knife 30 also comprises a pair of mounting openings 47, 48 for mounting shear knife 30 onto the arm or body of a conventional shear.

Referring now to FIGS. 1 and 6-9, the details of second knife 31 will now be described.

Second knife 31 comprises a block-like body section 53 having a female section 54 with a tapered shape recessed thereinto longitudinally in a downstream direction of the bar, (downstream being indicated by arrow 29 in FIG. 1). Female section 54 comprises means for receiving, in shearing relation, male section 34 of first knife 30. The female section has a downwardly facing peripheral cutting edge 55 extending from a pair of upstream ends 56, 57 to a downstream tip 58 and defining the tapered shape. Peripheral cutting edge 55 on female section 54 has a continuous vertical rise from its upstream ends 56, 57 to its downstream tip 58.

As is apparent from the figures, peripheral cutting edge 35 on male section 34 is symmetrical about center line 39 on the top surface of the first knife, and peripheral edge 55 on female section 54 conforms to peripheral cutting edge 35 on male section 34.

Referring to FIG. 6, peripheral cutting edge 55 has a curved part 69 extending between a pair of intermediate points 65, 66 each located between downstream tip 58 and a respective upstream end of the cutting edge 56, 57. Peripheral cutting edge 55 comprises straight parts 71, 72 each of which is located between a respective intermediate point 65, 66 and a corresponding upstream end 57, 56. Straight parts 71, 72 are tangential to curved part 69 at intermediate points 65, 66. As a result of these configurations, the tapered recess of female section 54 has a rounded, wedge shape conforming to the rounded, wedge shape of male section 34 on first knife 30.

Second shear knife 31 also comprises a pair of mounting openings 67, 68 for mounting second knife 31 on the arm or body of a conventional shear.

Figure 10:
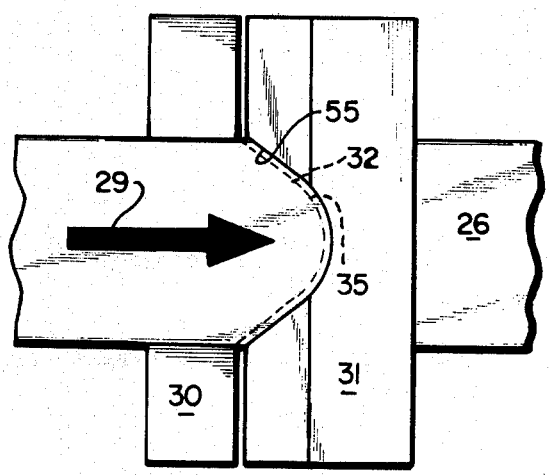
FIG. 10 is a plan view illustrating a metal bar undergoing a shearing operation utilizing shearing knives in accordance with an embodiment of the present invention.
Figure 11:
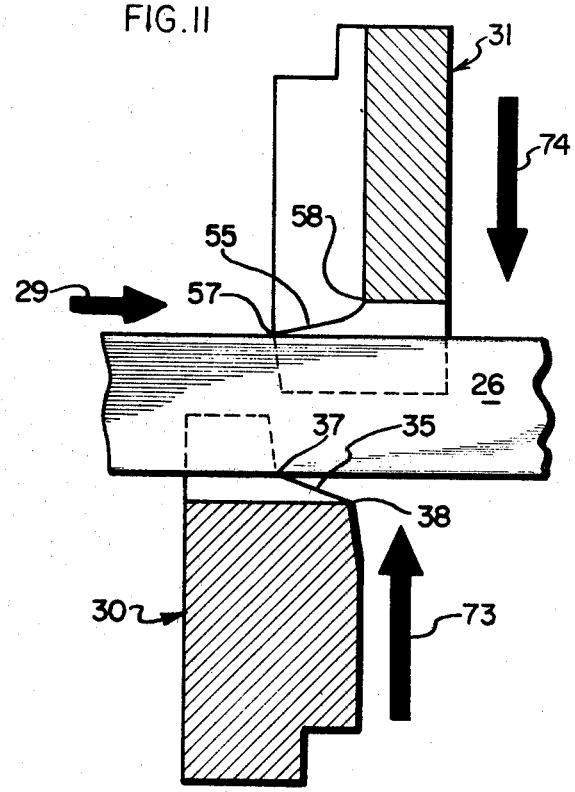
FIG. 11 is a sectional view illustrating a shearing operation in accordance with the present invention.

The operation of the shear knives is illustrated in FIGS. 10 and 11. Initially, the two shear knives 30, 31, are disposed in a spaced apart or open relationship as shown in FIG. 1. A metal bar undergoing hot rolling is moved between the two shear knives in a downstream direction indicated by arrow 29. When a pre-determined portion of the metal bar has moved downstream of the shear knives, the shear (not shown in FIGS. 10–11) is actuated in a conventional manner, and the two shear knives 30, 31 are moved vertically relative to one another and to the bar as illustrated by the arrows 73, 74 in FIG. 11. Alternatively, one of the shear knives may remain stationary and only the other shear knife may be moved.

Because the rounded, wedge shaped peripheral cutting edge 35 on the first or lower shear knife 30 declines from its upstream ends 36, 37 to its downstream tip 38 and because the rounded wedge shaped, peripheral cutting edge 55 on a second or upper knife 31 rises from its upstream ends 56, 57 to its downstream tip 58, the shearing action resulting from moving the two shear knives vertically toward each other proceeds progressively from the upstream ends to the downstream tips of the two peripheral cutting edges 35, 55.

The net effect is a scissors-like cutting action on the metal bar during the shearing operation which allows the full force of the shear initially to be concentrated at that part of the bar engaged by the upstream end points of the cutting edges, and then gradually to be brought to bear on the remainder of the bar. In order to produce this type of scissors action, the angle between (a) the inclined top surface portions 40, 41 of first knife 30 and (b) a horizontal plane extending through top surface center line 39 (FIG. 3) must be in the range of about 6° to about 25° (13° to 17° preferred). If this angle were below 6°, there would be no scissors action. If this angle were above 25°, other problems could occur, such as a fracturing of the knife or a possible distortion of the metal bar undergoing shearing. Similarly, if the above-described third angle (that is the angle between (a) horizontal plane 61 and (b) the tangent to the projection of curved part 59 on a vertical plane parallel to center line 39, at the point of intersection with plane 61), is less than 6°, there would be no effective scissors action.

Absent angular parameters which produce a scissors action, the shearing of a rounded, wedge shaped bar 26 would require a much greater total shearing force than was required to shear a flat or planar end on the metal bar. By providing the peripheral cutting edges 35, 55 with the shape and angular relationships described above, the shearing force required and the impact developed by the shearing action are essentially no greater than those occurring when using conventional shearing knives which shear a flat or planar end on the metal bar. As a result, a shear knife in accordance with the present invention may be utilized with conventional shears already in place in hot rolling mills and there is no need to increase the size of the shear thereby avoiding an increase in cost.

Figure 12:
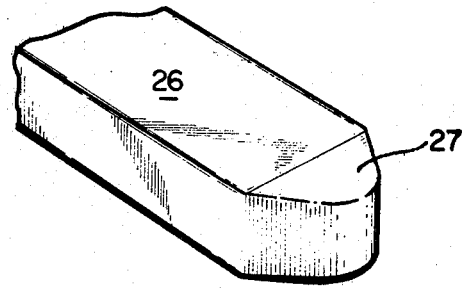
FIG. 12 is a perspective illustrating the tapered end on a metal bar sheared in accordance with the present invention.
Figure 13:
FIG. 13 is a side view of the metal bar of FIG. 12.

As noted above, a shearing method in accordance with the present invention produces, on metal bar 26, a tapered or rounded, wedge shaped, downstream end 27 (FIGS. 12 and 13), and this minimizes cobbling and split ends if not entirely eliminating them during a hot rolling operation.

Referring to FIG. 10, when the two shear knives 30, 31 are in an operational relationship, there may be a horizontal gap 32 between the vertically disposed, curved planes in which move peripheral edges 35, 55 of the two shear knives 30, 31. In accordance with the present invention, gap 32 may have a size up to 3/16 of an inch, without causing problems. In the past, whem employing conventional shear knives which sheared a flat or planar end on the metal bar, the horizontal gap between the vertical planes in which moved the upper and lower shear knives could be no greater than about 1/16 of an inch without inviting problems. Because gap 32 between the upper and lower knives of the present invention may be as large as 3/16 of an inch, operators need not be so meticulous in setting up the knives as they were with conventional knives, and a minor enlargement of this gap during operation (e.g., due to misalignment of shear bearings, etc.) doesn't cause problems as it might have with conventional knives.

As illustrated in FIG. 11, bar 26 is thicker than the vertical component of the slope of a peripheral cutting edge 35 or 55 between its upstream ends and its downstream tip. A shearing method or shearing knives in accordance with the present invention may be used on virtually any size bar heretofore sheared during a hot rolling operation (e.g. up to 8"×8", for example).

The shear knives 30, 31 may be constructed of the same material heretofore utilized for shear knives, e.g. H-11 or H-13 tool steel grades. The hardness of the cutting edges 35, 55, at the time of installation, should be in the range 48–51 on the Rockwell C hardness scale.

The temperature of the metal bar at the time it undergoes a shearing operation may be as high as the rolling mill rolls will accommodate. More specifically, if the metal bar is too hot at the time it undergoes rolling, it becomes fluid and slips in the rolling mill. However, at temperatures of 2200° F. or lower, this is not a problem. Typically, at the time of the shearing step at shear 23 (FIG. 14), the downstream end portion of metal bar 26 has a temperature greater than about 1650° F. (899° C.) while the upstream portions of the bar have a temperature less than about 2200° F. (1204° C.), in a typical operation.

Although, in the embodiment illustrated in FIG. 14, shear 23 is located between upstream rolling stands 21, 22 and downstream rolling stands 24, 25, a shear having knives 30, 31 in accordance with the present invention may be located immediately downstream of a furnace, such as 20 illustrated in FIG. 14, when it is appropriate or desirable to form a tapered end on the metal bar before it enters any rolling stand. In such a case, it may also be appropriate and desirable to put another shear at an intermediate location in the rolling mill (as shown in FIG. 14 at 23). This is because, as the downstream end of the bar progresses further downstream, it becomes harder and harder, compared to upstream portions of the bar, so that it may become necessary to shear off about two to four feet at the downstream end of the metal bar so as to avoid problems which arise when the downstream end of the metal bar is too hard. These include damage to the rolls and end splitting, as described above.

The foregoing detailed description has been given for clearness of understanding only, and no unnecessary limitations should be understood therefrom, as modifications will be obvious to those skilled in the art.

We claim:

1. In combination, a pair of shear knives for shearing a tapered end on a metal bar extending longitudinally in a downstream direction, said combination comprising:
   a first shear knife having a male section with a tapered shape protruding from said knife in the downstream direction of said bar;
   said male section having an upwardly facing peripheral cutting edge extending from a pair of upstream ends to a downstream tip and defining said tapered shape;
   said peripheral cutting edge on said male section having a continuous vertical drop from said upstream ends to said downstream tip;
   a second shear knife having a female section with a tapered shape recessed into said knife longitudinally in said downstream direction of said bar;
   said female section comprising means for receiving, in shearing relation, said male section of the first knife;
   said female section having a downwardly facing peripheral cutting edge extending from a pair of upstream ends to a downstream tip and defining said tapered shape;
   said peripheral cutting edge on said female section having a continuous vertical rise from said upstream ends to said downstream tip;
   and means, including the shape and angular parameters of said male section, for producing a scissors-like cutting action on the metal bar undergoing shearing without fracturing said first shear knife or distorting said metal bar and with a total shearing force substantially no greater than that required to shear a flat end on said bar.

2. In the combination of claim 1 wherein:
   said male section has a top surface with a center line extending in said downstream direction;
   said top surface being inclined upwardly and outwardly from said center line to said peripheral cutting edge on the male section to provide a V-shaped cross-section in a plane transverse to said center line.

3. In the combination of claim 2 wherein:
   said peripheral cutting edge on said male section is symmetrical about said center line;
   and said peripheral cutting edge on said female section conforms to the peripheral cutting edge on the male section.

4. In the combination of claim 2 wherein:
   the angle between said inclined top surface and a horizontal plane extending through said center line is in the range of about 6° to about 25°.

5. In the combination of claim 3 wherein:
   said angle is in the range of about 13° to about 17°.

6. In the combination of claim 2 wherein:
   each peripheral cutting edge has a curved part extending from its downstream tip to a pair of points each intermediate the downstream tip and a respective upstream end of the peripheral cutting edge;
   the peripheral cutting edge from said intermediate point to said respective upstream end being tangent to the curve on said edge at the intermediate point;
   whereby said tapered shape is a rounded, wedge shape.

7. In the combination of claim 6 wherein:
   there is a first angle, between a horizontal plane passing through said center line and the projection of said curved part of the peripheral cutting edge, immediately adjacent said tip, on a vertical plane perpendicular to said center line, said first angle being in the range of about 6° to about 25°.

8. In the combination of claim 7 wherein:
   there is a second angle, between (a) a horizontal plane parallel to said center line and (b) said tangential part of said peripheral cutting edge, which is less than said first angle;
   and there is a third angle, between (c) a horizontal plane parallel to said center line and (d) the tangent to the projection of said curved part of the peripheral cutting edge on a vertical plane parallel to said center line, at the point of intersection with said last-recited horizontal plane;
   said third angle varying along said curved part from a minimum equal to said first angle, at said intermediate point, to a maximum of 90° at said tip.

9. In the combination of claim 8 wherein:
   the angle between said inclined top surface and a horizontal plane extending through said center line is in the range of about 6° to about 25°;
   and said third angle is no less than 6°.

10. A method for forming a tapered end on a metal bar extending longitudinally in a downstream direction, said method comprising the steps of:
   providing a first shear knife having a male section with a tapered shape protruding from said knife in the downstream direction of said bar;
   said male section having an upwardly facing peripheral cutting edge extending from a pair of upstream ends to a downstream tip and defining said tapered shape;
   said peripheral cutting edge on said male section having a continuous vertical drop from said upstream ends to said downstream tip;
   providing a second shear knife having a female section with a tapered shape recessed into said knife longitudinally in said downstream direction of said bar;
   said female section comprising means for receiving, in shearing relation, said male section of the first knife;
   said female section having a downwardly facing peripheral cutting edge extending from a pair of upstream ends to a downstream tip and defining said tapered shape;
   said peripheral cutting edge on said female section having a continuous vertical rise from said upstream ends to said downstream tip;
   introducing said metal bar between said shear knives;
   moving at least one of said shear knives toward the other to shear said metal bar, with the shearing action proceeding progressively from the upstream ends to the downstream tips of the peripheral cutting edges on both of said knives;

and controlling the shape and angular parameters of said male section to produce a scissors-like cutting action on said metal bar without fracturing said first shear knife or distorting said metal bar and with a total shearing force substantially no greater than that required to shear a flat end on said bar.

11. A method as recited in claim 10 and comprising the further steps of:

moving said metal bar in a downstream direction;

and shearing said metal bar while it undergoes said moving.

12. A method as recited in claim 11 and comprising the further steps of:

heating said metal bar to a hot reduction temperature before said moving step;

and subjecting said metal bar to a plurality of hot reduction operations during said moving step;

said shearing step being conducted after said metal bar has undergone some, but not all, of said hot reduction operations;

the tapered end formed on said metal bar during said shearing step being formed at the downstream end of said bar;

whereby cobbling is minimized during the hot reduction operations performed downstream of said shearing step.

13. In a method as recited in claim 12 wherein:

said bar has a downstream end portion which is colder and harder than portions of said bar upstream of said downstream end portion, at the time of said shearing step;

and said downstream end portion is removed by said shearing step.

14. In a method as recited in claim 13 wherein:

said upstream portions of the bar have a temperature less than about 2200° F. (1204° C.) and said downstream end portion has a temperature greater than about 1650° F. (899° C.), at the time of said shearing step.

* * * * *